(12) United States Patent
Kori et al.

(10) Patent No.: US 8,400,040 B2
(45) Date of Patent: Mar. 19, 2013

(54) PERMANENT MAGNET TYPE ROTARY ELECTRIC MACHINE

(75) Inventors: Daisuke Kori, Hitachinaka (JP);
Hiroyuki Mikami, Hitachinaka (JP);
Seikichi Masuda, Hitachi (JP);
Mamoru Kimura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 12/684,485

(22) Filed: Jan. 8, 2010

(65) Prior Publication Data

US 2010/0176682 A1 Jul. 15, 2010

(30) Foreign Application Priority Data

Jan. 9, 2009 (JP) ................................. 2009-003022

(51) Int. Cl.
*H02K 1/27* (2006.01)
*H02K 21/14* (2006.01)

(52) U.S. Cl. ........ 310/156.49; 310/156.53; 310/216.092

(58) Field of Classification Search ............. 310/156.53, 310/156.45, 156.48, 156.49, 216.091, 216.092, 310/216.097, 216.104, 216.111, 216.112, 310/216.103, 216.099
See application file for complete search history.

(56) References Cited

U.S. PATENT DOCUMENTS

| 5,973,460 A * | 10/1999 | Taga et al. ................... 318/139 |
| 2007/0085436 A1 * | 4/2007 | Tajima et al. ............ 310/156.46 |
| 2008/0007131 A1 * | 1/2008 | Cai et al. .................. 310/156.38 |

FOREIGN PATENT DOCUMENTS

| JP | 2004-260888 | 9/2004 |
| JP | 2006-333656 | 12/2006 |

* cited by examiner

*Primary Examiner* — Burton Mullins
(74) *Attorney, Agent, or Firm* — Brundidge & Stanger, P.C.

(57) ABSTRACT

A permanent magnet type rotary electric machine has a rotor having a rotor core and permanent magnets buried into the rotor core by being incorporated into respective permanent magnet slots. The permanent magnet slot per one pole is divided at least into four slots along an outer circumferential direction in the rotor core, and in respective rest core-portions between adjacent divided permanent magnet slots in the rotor core, a width of a first rest core-portion at the middle of each pole and a width of a second rest core-portion between adjacent poles of different polarities are formed larger than that of the others.

12 Claims, 10 Drawing Sheets

$120° \leqq \theta \leqq 150°$ r1=r2=r3=r4=r5=r6

PERMANENT MAGNET TYPE ROTARY ELECTRIC MACHINE

CLAIM OF PRIORITY

The present application claims priority from Japanese application serial no. 2009-003022, filed on Jan. 9, 2009, the content of which is hereby incorporated by reference into this application.

FIELD OF THE INVENTION

The present invention relates to a permanent magnet type rotary electric machine, in particular, relates to a permanent magnet type rotary electric machine employing a permanent magnet for a rotor that is, for example, suitable for a railway rolling stock.

BACKGROUND OF THE INVENTION

A wound rotor type generator and an induction motor conventionally have been used as a rotary electric machine used for a railway rolling stock. However, in these days, instead of them, as high performance and cost reduction of permanent magnets and wide spreading of high performance inverter are realized, a trend of employing a permanent magnet type electric rotary machine is increasing since the permanent magnet type electric rotary permits to reduce size and weight thereof as well as to realize a high efficiency.

In such a situation, in order to improve an electric characteristic and a mechanical strength characteristic of the rotary electric machine, rotor structures using variety types of permanent magnets have been investigated.

For example, Patent Document 1 (JP-A-2006-333656) discloses a structure in which permanent magnets are buried in respective permanent magnet slots formed inside a rotor core, and the adjacent slots in which the permanent magnets are buried are disposed so as to constitute nearly an inverted obtuse V shape when seeing them a rotor shaft side. In addition, the structure has a bridge portion being provided in between respective adjacent slots (each two slots) so as to connect a salient pole portion forming the outer side of the slots to the inner side central portion. Patent Document 2(JP-A-2004-260888) discloses a structure in which a plurality of slots are formed along the circumferential direction of a rotor in an adjacent manner, permanent magnets are buried in the respective slots, and the sides at both ends in the circumferential direction of the respective slots are respectively slanted and the connection part with the other side thereof is formed in an circular portion.

By employing these structures, stress concentration acting on between the adjacent slots can be avoided.

Incidentally, in the case of a rotary electric machine used for a railway rolling stock, since the weight thereof greatly affects to riding comfort of the railway rolling stock, it becomes a key point to reduce the weight of the rotary electric machine. Particularly, with respect to a large capacity rotary electric machine of a class having an output of several hundreds kW~several MW, as the physical size of the rotary electric machine becomes larger, there is occurred specific problems to a large capacity machine become remarkable. That is, in the rotor structure of a rotary electric machine, in view of an easy assembling and reduction of number of parts, frequently employed structure is such that permanent magnet slots are provided for a rotor core and permanent magnets are buried in the permanent magnet slots. A disadvantage of this structure is such that the electric characteristic and the mechanical strength characteristic are in a trade-off relationship depending on the structure of the permanent magnet slots and the position thereof inside the rotor.

As the size of a rotary electric machine increases, the centrifugal force of the rotor increases, therefore, it is required to have a mechanical strength enduring such centrifugal force, to ensure reliability and to satisfy a specified electric characteristic. Further, as the rotary machine upsizes, the amount of material to be used increases, therefore, in view of the cost reduction, it is desired to reduce the amount of magnet to be used and to use low cost materials.

As has been explained above, Patent Document 1 discloses a structure in which the slots where the permanent magnets are buried are disposed so that the respective adjacent slots form in nearly an inverted obtuse V shape when seeing them from a rotor shaft side and respective rest-core portions between the adjacent slots are formed in the rotor core, and the permanent magnet for each of poles is divided into four.

However, according to such a structure, in the rotor core, since the width of each of the rest core-portions between the adjacent slots (adjacent permanent magnet slots) and the position (in radial and circumferential directions) of the permanent magnets etc. are not specified, in particular, with respect to a large scaled rotary electric machine having a large capacity, in accordance with increases of circumferential velocity and of an amount of permanent magnet to be used, the centrifugal force also increases, accordingly, the consideration on both mechanical strength and electrical characteristics may be insufficient.

On the other hand, Patent Document 2 discloses a structure in which a permanent magnet constituting one pole is divided into five, all of the divided permanent magnets are disposed in parallel in a manner with no steps and at both end portions of a permanent magnet slot a curved portion and a slanted portion are provided.

However, with the structure of patent document 2, since the permanent magnets are disposed in parallel in the circumferential direction with no steps, great difference is caused in distances from the respective permanent magnet slots to the outer circumference of the rotor, the weight of the iron core increases depending on the corresponding length of the distance from the respective permanent magnet slots to the outer circumference of the rotor, and the centrifugal force also increases. Therefore, since such as the width of the respective rest-core portions between the adjacent slots and the configuration of the curved portions at the end portions of respective permanent magnet slots are the same, it is difficult to relax stress concentration relating to fatigue strength.

SUMMARY OF THE INVENTION

The present invention is to provide a permanent magnet type rotary electric machine that prevents an increase of an amount of magnet to be used even if the size of the rotary electric machine increases and satisfies both electrical and mechanical strength characteristics.

In order to achieve the above object, a permanent magnet type rotary electric machine of the present invention is basically configured as follows.

That is, the permanent magnet type rotary electric machine of the present invention comprises a stator with a stator core and coils provided into slots of the stator core, and a rotor that is disposed so as to face the stator with a gap, the rotor having a rotor core and permanent magnets buried into the rotor core by being incorporated into respective permanent magnet slots formed within an outer circumferential-side portions of the rotor core so as to be a plurality of poles. In addition to that, the permanent magnet slot per one pole is divided at least into four slots along an outer circumferential direction in the rotor core, and in respective rest core-portions between adjacent divided permanent magnet slots in the rotor core, a width of a first rest core-portion at the middle of each pole and a width of a second rest core-portion between adjacent poles of different polarities are formed larger than that of the others.

According to the present invention, since an amount of magnet to be used is decreased even if the size of the rotary electric machine increases and in addition both electrical and mechanical strength characteristics can be satisfied, such are very effective for this kind of permanent magnet type rotary electric machine.

DETAILED DESCRIPTION OF THE PREFERRED EMBODIMENTS

Figure 1:
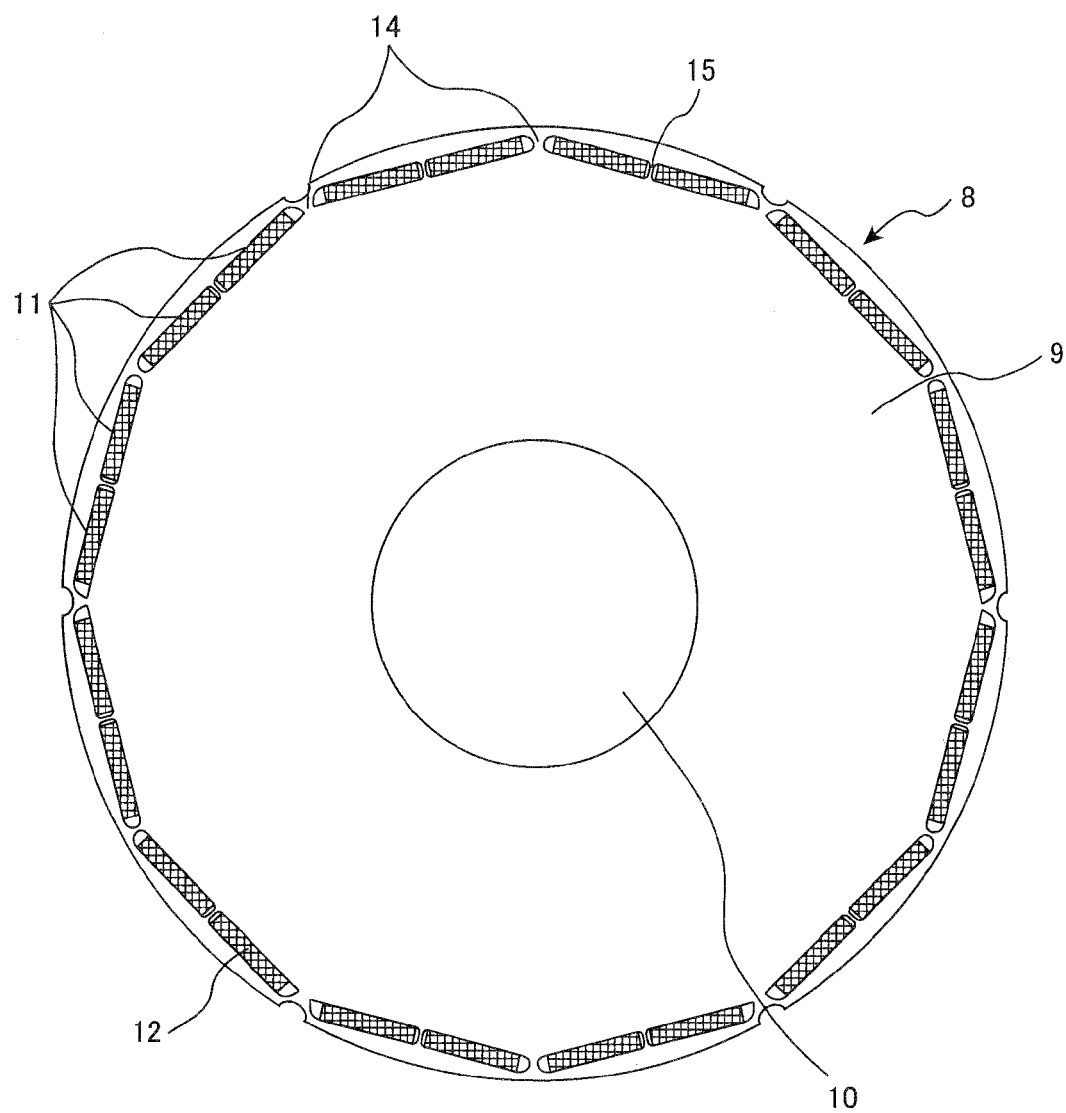
FIG. 1 is a cross sectional diagram showing a rotor employed in a permanent magnet type rotary electric machine of the present invention (embodiment 1).

Herein below, embodiments of permanent magnet type rotary electric machines of the present invention will be explained with reference to drawings. Further, the corresponding portions in the respective drawings will be explained while denoting with the same reference numerals.

Embodiment 1

Figure 7:
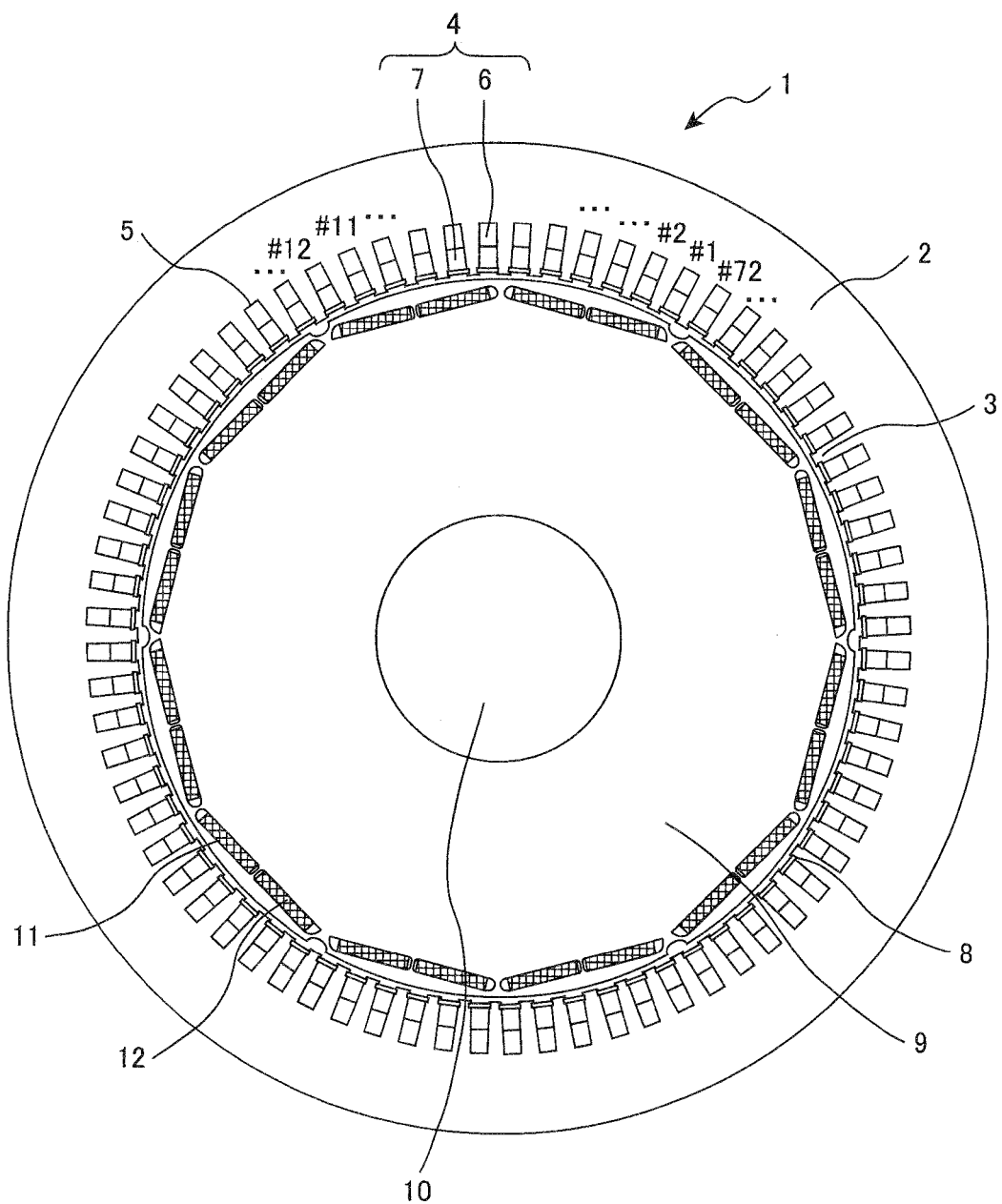
FIG. 7 is a cross sectional diagram showing an entire constitution of a permanent magnet type rotary electric machine of the present invention (embodiment 1).

In FIG. 7, an embodiment of a permanent magnet type rotary electric machine of the present invention is shown. The permanent magnet type rotary electric machine 1 of the present embodiment is a rotary electric machine of six poles and 72 slots, is used for a generator for an electric rolling stock in a class of several MW, and is rotated in a range of 1500~2500 per min.

As shown in the drawing, a stator 2 is a distributed winding type stator constituted by a cylindrically shaped stator core 2' with a plurality of teeth 3 projecting toward an inside of the stator core 2' from a yoke portion of the stator core 2' and a coil 4 formed by winding element wires to the teeth 3 distributedly. The coil 4 is formed in three phase windings of U phase, V phase and W phase, and is wound in a manner to form six poles electrically with the 72 slots. In the stator coil 4, an upper coil 6 thereof is disposed at the outer radial side of each slot 5 formed between adjacent teeth 3 and a lower coil 7 is disposed at the inner radial side of the slot 5. The coil 4 is wound in a short-pitch winding mode, the short-pitch winding capable of reducing eddy currents compared with a full-pitch winding mode. When assigning numbers from #1 to #72 to the slots 5 in anticlockwise direction for convenience, the coil 4 of the three phase windings is constituted in such a manner that an element wire coming out from the lower coil 7 at slot #1 is connected to the upper coil 6 at slot #11, and subsequent to that, such connection mode is repeated in the circumferential direction, such as from the lower coil 7 at slot #2 to the upper coil 6 at slot #12, from the lower coil 7 at slot #3 to the upper coil 6 at slot #13, . . . . In the present embodiment, a winding pitch value 10 is obtained by subtracting 1 from #11 and a pole pitch value 12 is given by dividing the slot number 72 by the pole number 6. When determining the ratio of the winding pitch and the pole pitch (short pitch degree) as ⅚, spatial harmonic waves of 5th and 7th orders are reduced.

Further, in the present embodiment, although the combination of six poles and 72 slots is employed, combinations of other numbers of poles and slots, and further, combinations with such as concentrated winding and full pitch winding can be used. A rotor 8 is disposed to be rotatable in coaxial manner with the stator 2.

FIG. 1 shows the rotor in the permanent magnet type rotary electric machine representing embodiment 1 of the present invention. As shown in the drawing, four permanent magnet slots 11 per one pole are disposed in the circumferential direction of the rotor 8 at the outer circumferential-side core portion in the rotor core 9, and permanent magnets 12 are respectively buried in the respective permanent magnet slots 11. With regard to the permanent magnets 12, four permanent magnets of same polarity are buried for every poles, thus, 24 permanent magnets in total are buried in the rotor in the circumferential direction thereof. With regard to the configuration of the permanent magnets 12, all of them are same configuration and are buried in the divided permanent magnets slots 11.

In the rotor core 9, each part between adjacent slots 11 in the circumferential direction is called as rest core portions 14 (namely 14a, 14b) or 15 that function as bridge between the adjacent slots 11, and in the rest-core portions 14 and 15, a width of a first rest-core portion 14a formed at the middle of each one pole comprising four respective divided permanent magnets 12 and a width of a second rest-core portion 14b formed at between adjacent poles of different polarities are designed larger than those of the other connection parts 15. The rotor core 9 is fixed to a rotor shaft.

Now, a relationship of electrical characteristic and mechanical strength characteristic with respect to the widths of the rest core-portions, the distance in radial direction of the permanent magnet slots and the number of the divided permanent magnet slots will be explained herein below with reference to drawings.

Figure 2:
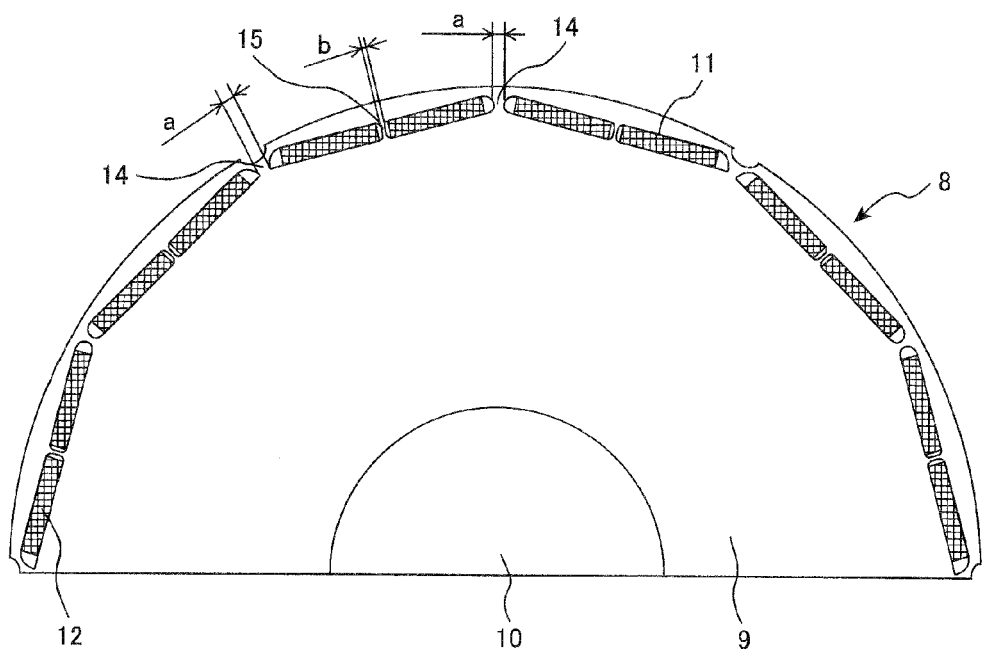
FIG. 2 is a ½ cross section of the rotor as shown in FIG. 1 and is a diagram showing widths of connection parts between permanent magnet slots (embodiment 1).

FIG. 2 is a ½ cross section of the rotor 8 as shown in FIG. 1 and is a diagram showing widths of rest core-portions between permanent magnet slots 11. When defining that the width of the first rest core-portion 14a formed at the middle of each one pole and the width of the second rest core-portion 14b formed at between adjacent poles of different polarities as "a", and the width of other rest core-portions 15 as "b", a relationship among ratio a/b, normalized induced voltage value representing an electrical characteristic and normalized stress value representing a mechanical strength characteristic is shown in FIG. 3.

Figure 3:
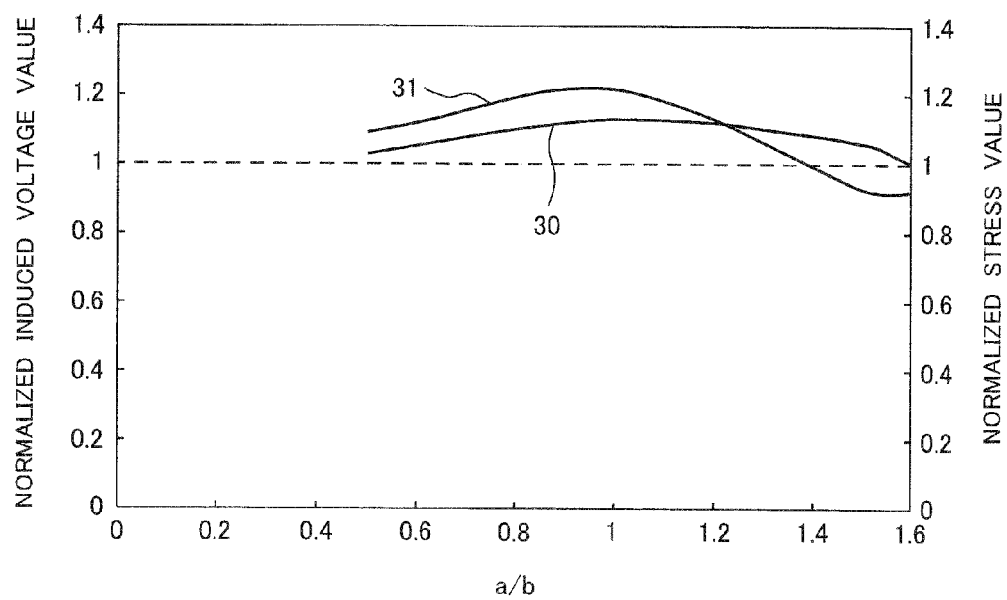
FIG. 3 is a characteristic diagram showing a relationship between widths of connection parts between permanent magnet slots in the present invention and normalized induced voltage value and normalized stress value (embodiment 1).

As shown in FIG. 3, as a/b on abscissa increases, the normalized induced voltage value reaches a maximum value near at 1 of a/b and as a/b exceeds over 1, the value decreases. The normalized stress value also reaches a maximum value near at 1 of a/b and as a/b exceeds over 1, the value decreases. A line 30 indicates the normalized induced voltage value wherein a value that satisfies a desired induced voltage is normalized as 1. A line 31 indicates the normalized stress value wherein a value that satisfies a desired stress is normalized as 1. When noting the normalized induced voltage value, in order to satisfy a target induced voltage, it is necessary to bring the normalized induced voltage value more than 1. On the other hand, when noting the stress, a target value is satisfied when the normalized stress value is brought to a value less than 1.

Accordingly, in order to satisfy the both, it is understood from the drawing that when the ratio a/b is more than 1.4, the normalized stress value is satisfied, and when the ratio a/b is less than 1.6, the normalized induced voltage value is satisfied.

Figure 4:
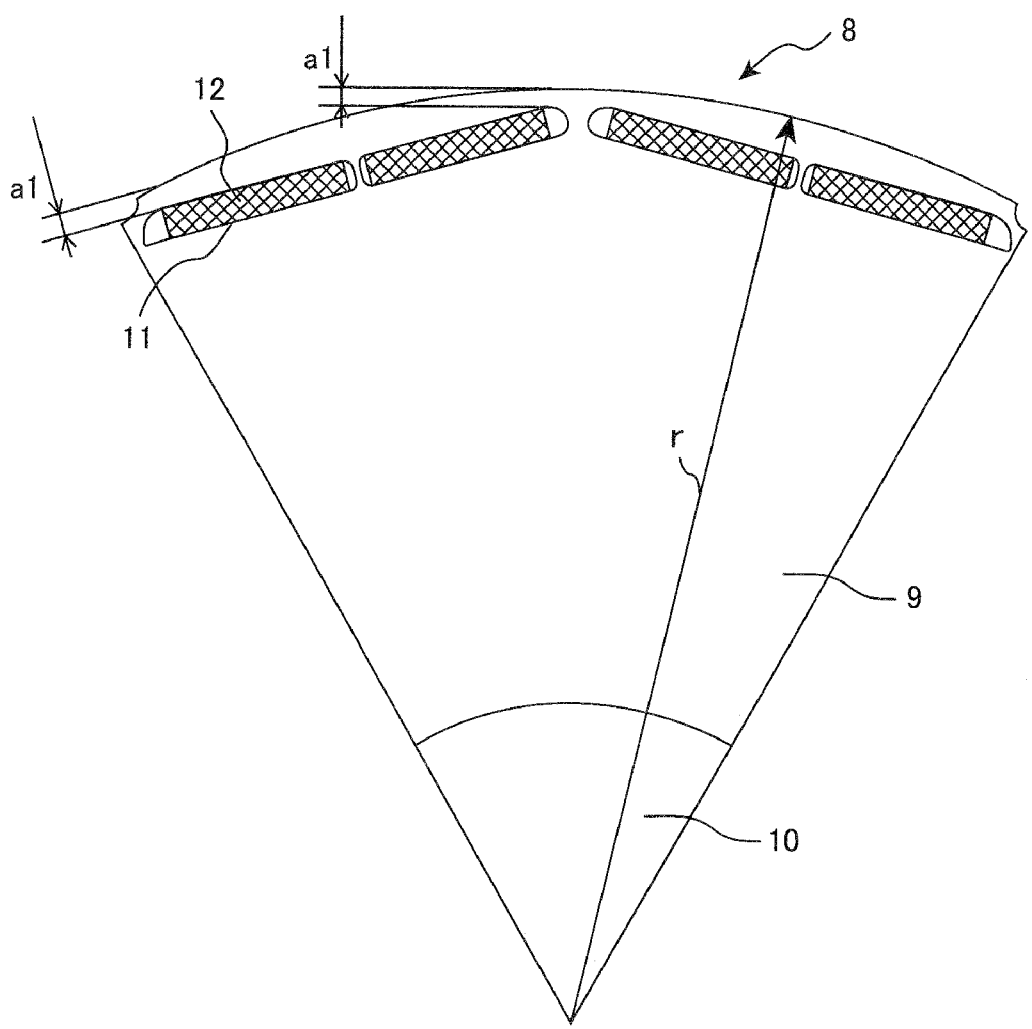
FIG. 4 is a ⅙ cross section corresponding to one pole of the rotor and is a diagram showing a distance between the permanent magnet slot and the outer circumference of the rotor (embodiment 1).

FIG. 4 is a ⅙ cross sectional diagram of the rotor core 9, which is corresponding to one pole of the rotor 8 and is a diagram showing a distance between the permanent magnet slot 11 and the outer circumference of the rotor core 9 in the radial direction of the rotor core 9. When defining the distance between the end at the rotor-outer circumferential side of the permanent magnet slot 11 at the middle of one pole and the outer circumference of the rotor core 9 is designed as "a1", and likewise, the distance between the end at the rotor-outer circumferential side of the permanent magnet slot 11 at between adjacent poles of different polarities and the outer circumference of the rotor core 9 is designed as "a1", and the radius of the rotor core as r, a relationship between ratio a1/r and normalized induced voltage value representing an electrical characteristic and normalized stress value representing a mechanical strength characteristic is shown in FIG. 5.

Figure 5:
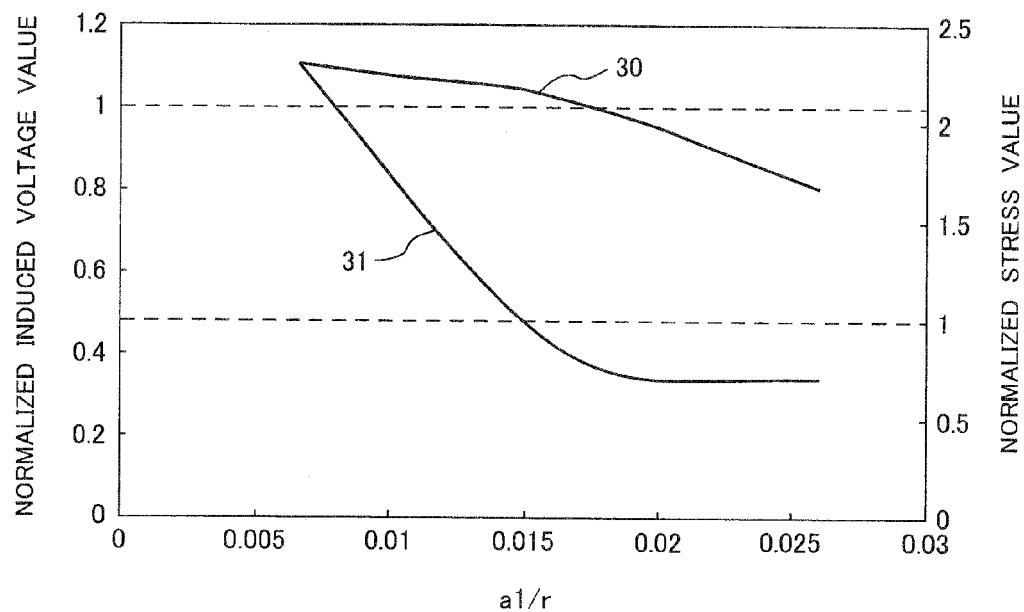
FIG. 5 is a characteristic diagram showing a relationship between normalized in radial direction distance value determined from the permanent magnet slot for the rotor and the outer circumference of the rotor in the present invention and normalized induced voltage value and normalized stress value (embodiment 1).

As shown in FIG. 5, as a1/r on abscissa increases, the normalized induced voltage value decrease as well as the normalized stress value. A line 30 indicates the normalized induced voltage value wherein a value that satisfies a desired induced voltage is normalized as 1. A line 31 indicates the normalized stress value wherein a value that satisfies a desired stress is normalized as 1. When noting the normalized induced voltage value, in order to satisfy a target induced voltage, it is necessary to bring the normalized induced voltage value more than 1. On the other hand, when noting the stress, a target value is satisfied when the normalized stress value is brought to a value less than 1.

Figure 6:
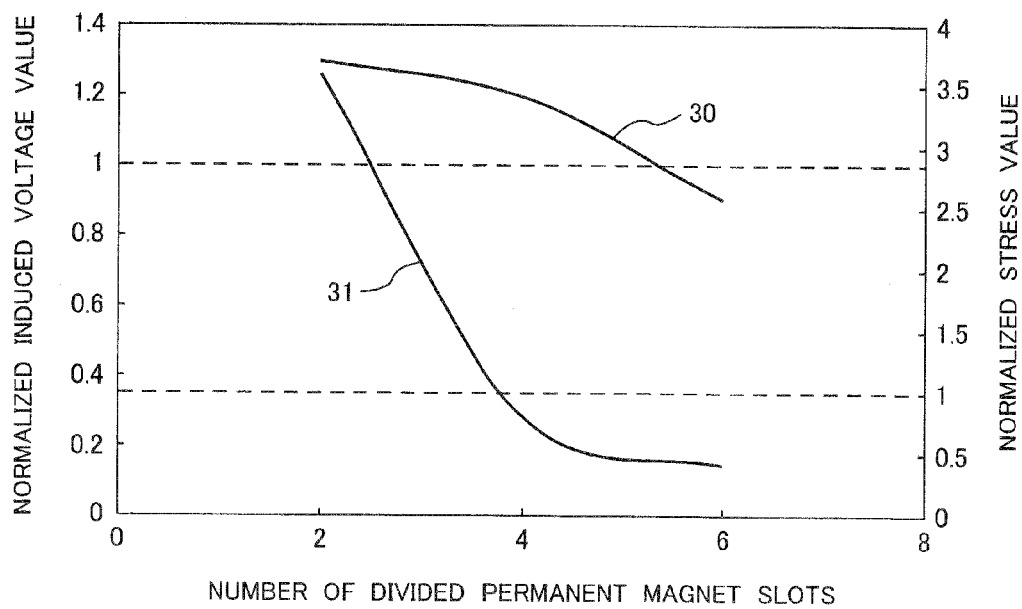
FIG. 6 is a characteristic diagram showing a relationship between divided permanent magnet slots number in the present invention and normalized induced voltage value and normalized stress value (embodiment 1).

Accordingly, in order to satisfy the both, it is understood from the drawing that when the ratio a1/r is more than 0.015, the normalized stress value is satisfied, and when the ratio a1/r is less than 0.0177, the normalized induced voltage value is satisfied. Incidentally, for example, a1 is set to be more than 0.9 mm and less than 1.1 mm, but such sizes are not limited in the embodiment FIG. 6 shows a relationship among divided permanent magnet slots-number, normalized induced voltage value representing an electrical characteristic and normalized stress value representing mechanical strength characteristic.

As shown in the drawing, as the divided permanent magnet slots number on abscissa increases, the normalized induced voltage value decrease as well as the normalized stress value. A line 30 indicates the normalized induced voltage value wherein a value that satisfies a desired induced voltage is normalized as 1. A line 31 indicates the normalized stress value wherein a value that satisfies a desired stress is normalized as 1. When noting the normalized induced voltage value, in order to satisfy a target induced voltage, it is necessary to bring the normalized induced voltage value more than 1. On the other hand, when noting the stress, a target value is satisfied when the normalized stress value is brought to a value less than 1.

Accordingly, it is understood from the drawing that as the number of divided permanent magnet slots when 4 or 5 is selected, the both are satisfied. Further, when considering an easy assembling, since it is desirable that the number of divided permanent magnet slots is small, in the present embodiment, the permanent magnet slots for one pole is divided into four.

In this embodiment, the configuration of all of the divided permanent magnet slots although is formed in a same size, but such can be divided in different sizes. Further, it is desirable that the curvature of the curved portion at each end of the permanent magnet slots is designed to be larger than a minimum radius of curvature required when performing a punching process. Further, in this embodiment, six poles although are selected as the poles of the rotor, other numbers of poles can be selected. When the range as shown in FIGS. 3, 5 and 6 is applied, in particular, when the range is applied to a large scaled permanent magnet rotary electric machine, the amount of permanent magnet to be used can be reduced and both electric characteristic and the mechanical strength characteristic can be satisfied with low cost electromagnetic steel plates.

Test results performed while combining the ranges in FIGS. 3, 5 and 6 are shown in Table 1.

TABLE 1

|  | FIG. 3 | FIG. 5 | FIG. 6 | Induced Power | Stress |
| --- | --- | --- | --- | --- | --- |
| Test Result 1 | 1.5 | 0.015 | 3 | ◯ | X |
| Test Result 2 | 1.4 | 0.015 | 4 | ◯ | ◯ |
| Test Result 3 | 1.5 | 0.016 | 4 | ◎ | ◎ |

TABLE 1-continued

|  | FIG. 3 | FIG. 5 | FIG. 6 | Induced Power | Stress |
|---|---|---|---|---|---|
| Test Result 4 | 1.6 | 0.0177 | 5 | ○ | ○ |
| Test Result 5 | 1.6 | 0.0185 | 4 | X | ◉ |

Judgment when applied to generator of several MW class ◉: optimum, ○: applicable, X: nonapplicable From Table 1, when the combined values are applied to a generator of several MW class, the test result 3 showed to be most suitable. The test results 2 and 4 remain in the applicable range of FIGS. 3, 5 and 6 and when the same are applied to a generator of several MW class, the test result 2 represents the lower limit and the test result 4 represents the upper limit. Although the test result 1 satisfies for a generator of a several MW class with regard to the induced voltage, but showed a high concentrated stress that makes difficult to apply the to a generator of several MW class. On the other hand, the test result 5 satisfies for a generator of a several MW class with regard to the concentrated stress, but showed a poor induced voltage that makes difficult to apply the same to a generator of several MW class.

Accordingly, when combining the conditions as shown in FIGS. 3, 5 and 6, the test results 1 and 5 are determined as out of the range and the test results 2, 3 and 4 are determined as acceptable as satisfying the conditions according to the present embodiment

Embodiment 2

Figure 8:
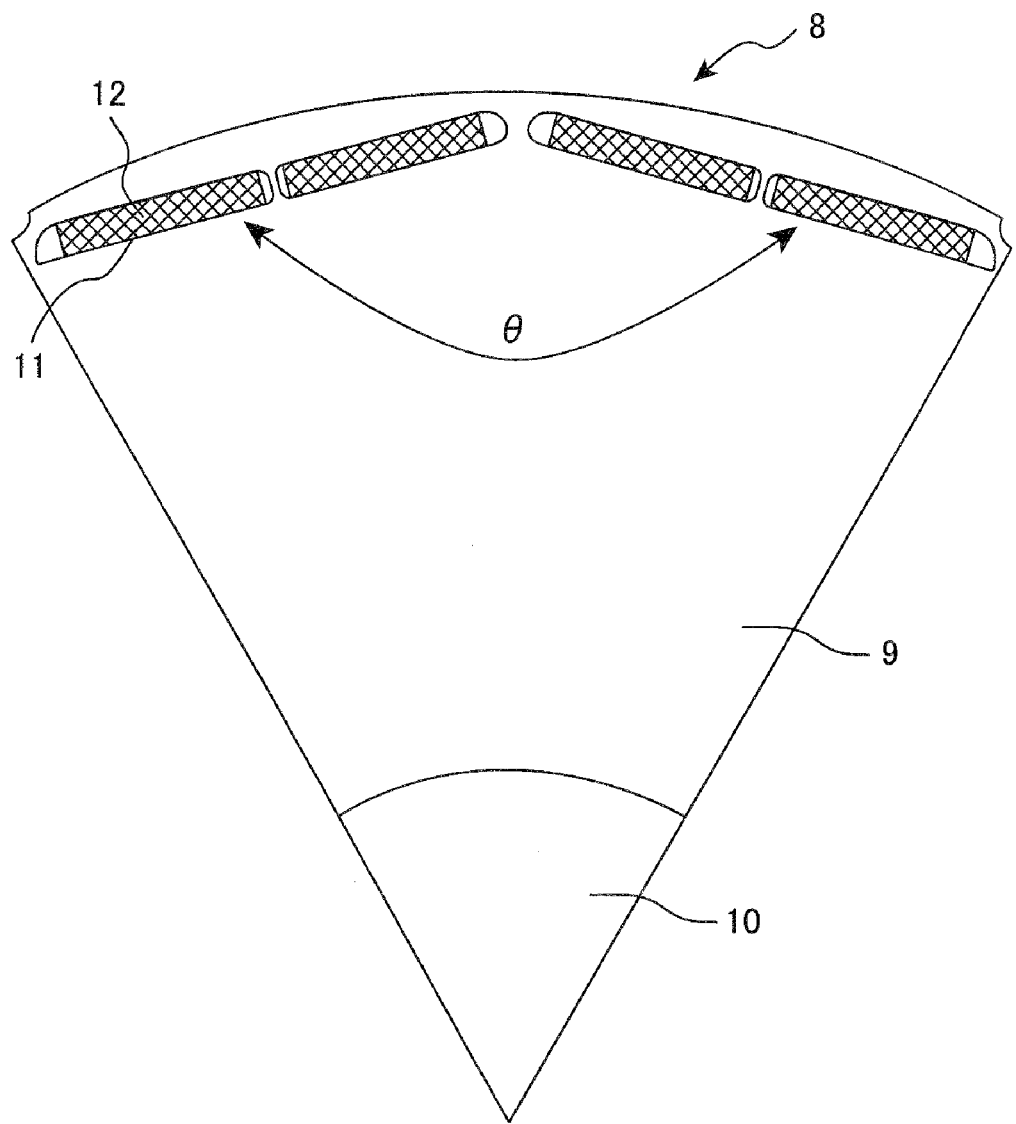
FIG. 8 is a diagram showing a ⅙ cross section corresponding to one pole of a rotor representing embodiment 2 of the present invention (embodiment 2).

FIG. 8 shows a ⅙ cross sectional diagram corresponding to one pole of a rotor 8 representing embodiment 2 of the present invention. The permanent magnets 12 for the rotor 8 as shown in connection with embodiment 1 are disposed in an inverted obtuse V shape when seeing them from the rotor shaft side, and when defining that the opening angle of the permanent magnets 12 constituted in an inverted obtuse V shape is θ, the θ is determined in the range of $120° \leq θ \leq 150°$. While limiting the opening degree θ of the permanent magnets 12 in the above range, and when disposing the permanent magnets 12 in an inverted obtuse V shape, the conditions indicated in connection with embodiment 1 become easily applicable and the position of the permanent magnet slots is optimized. The whole of the permanent magnet slots 12 is disposed in a polygonal shape.

Embodiment 3

Figure 9:
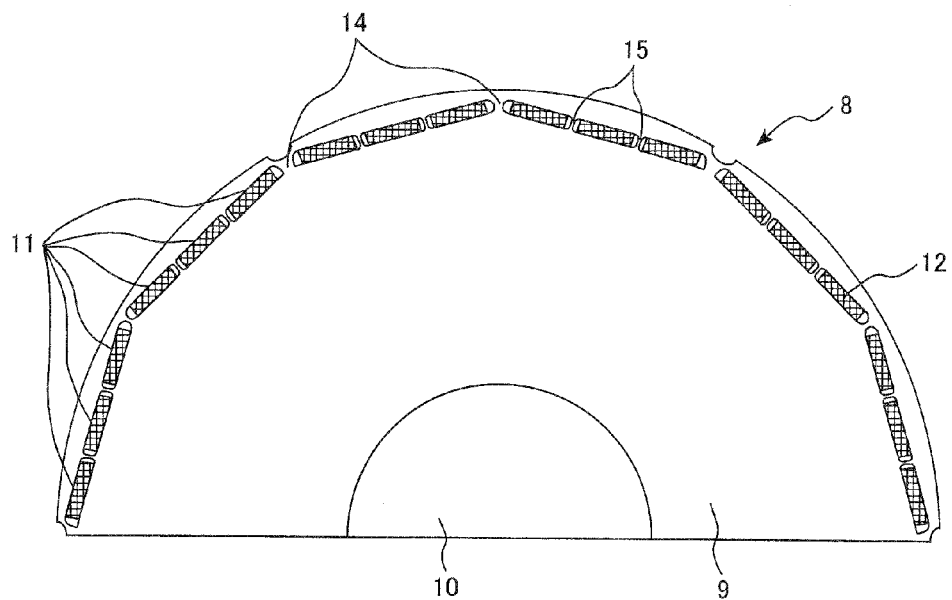
FIG. 9 is a diagram showing a ½ cross section of a rotor representing embodiment 3 of the present invention (embodiment 3).

FIG. 9 shows a ½ cross sectional diagram of a rotor 8 representing embodiment 3 of the present invention. As shown in the drawing, six permanent magnet slots 11 per one pole are disposed in circumferential direction of the rotor in the rotor core 9 and the permanent magnets 12 are buried in these permanent magnet slots 11. With regard to the permanent magnets 12, six permanent magnets of same polarity are buried for every poles, thus, 36 permanent magnets in total are buried in the rotor in the circumferential direction thereof. With regard to the configuration of the permanent magnets 12, all of them are same configuration and are buried in the divided permanent magnets slots 11. As well as the embodiments 1 and 2, in the rotor core 9, each part between adjacent slots 11 in the circumferential direction is configured by a rest core-portion 14 (namely 14a, 14b) or 15, and in the rest core-portions 14 and 15, a width of the first rest core-portion 14a formed at the middle of each one pole comprising six respective divided permanent magnets 12 and a width of the second rest core-portion 14b formed at between adjacent poles of different polarities are designed larger than those of the other rest core-portions 15. In the present embodiment, although six poles are selected as the poles of the rotor, other numbers of poles can be selected.

Embodiment 4

Figure 10:
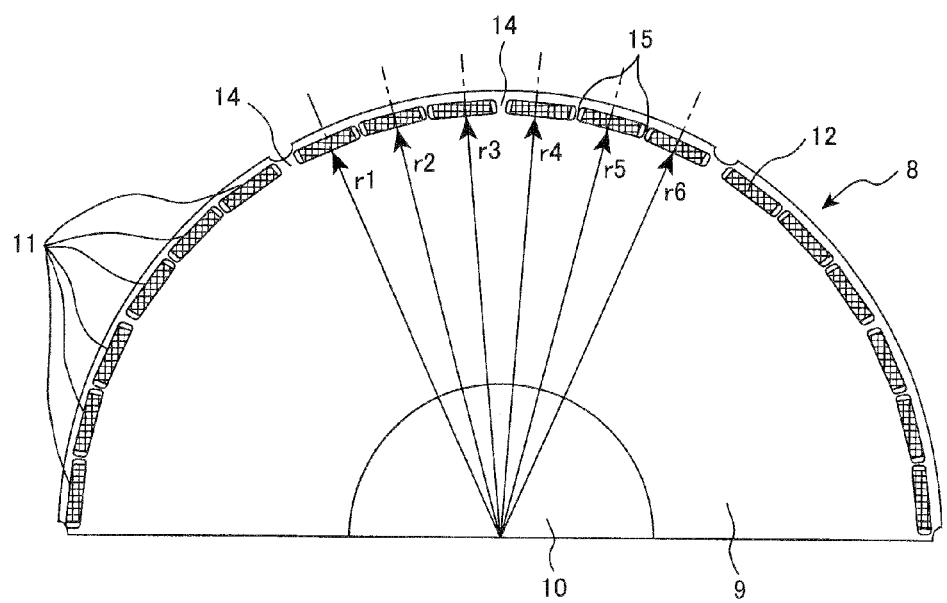
FIG. 10 is a diagram showing a ½ cross section of a rotor representing embodiment 4 of the present invention (embodiment 4).

FIG. 10 shows a ½ cross sectional diagram of a rotor 8 representing embodiment 4 of the present invention. As shown in the drawing, a permanent magnet slot 11 in the rotor core 9 per one pole is divided into six in the circumferential direction of the rotor and all of the thus divided permanent magnet slots 11 are disposed at the same positions in radial direction of the rotor so as to be r1=r2=r3=r4=r5=r6. With regard to the permanent magnets 12, six permanent magnets of same polarity are buried for every poles, thus, 36 permanent magnets in total are buried in the rotor in the circumferential direction thereof. With regard to the configuration of the permanent magnets 12, all of them are same configuration and are buried in the divided permanent magnets slots 11. As well as the embodiments 1 to 3, in the rotor core 9, each part between adjacent slots 11 in the circumferential direction is configured by a rest core-portion 14 (namely 14a, 14b) or 15, and in the rest core-portions 14 and 15, a width of the first rest core-portion 14a formed at the middle of each one pole comprising six respective divided permanent magnets 12 and a width of the second rest core-portion 14b formed at between adjacent poles of different polarities are designed larger than those of the other rest core-portions 15. In the present embodiment, although six poles are selected as the poles of the rotor, other numbers of poles can be selected.

Embodiment 5

Figure 11:
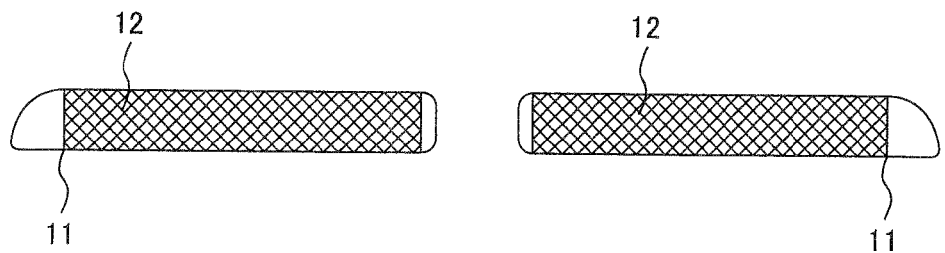
FIG. 11 is a diagram showing a cross section of permanent magnet slots corresponding to those in half of one pole of a rotor representing embodiment 5 of the present invention (embodiment 5).

FIG. 11 shows a cross sectional diagram of permanent magnet slots 11 and permanent magnets 12 corresponding to those in half of one pole for a rotor 8 representing embodiment 5 of the present invention. In the present embodiment, each divided permanent magnet slot 11 is formed in an asymmetrical configuration with respect to right and left. Through forming the configuration of the divided permanent slot 11 in asymmetry, only the radius of curvature at the curved portion thereof where the maximum stress concentration is caused can be enlarged, thereby, the area for the magnet slot decreases when compared with that formed in symmetry, and a reduction of magnetic property thereof can be prevented.

Embodiment 6

Figure 12:
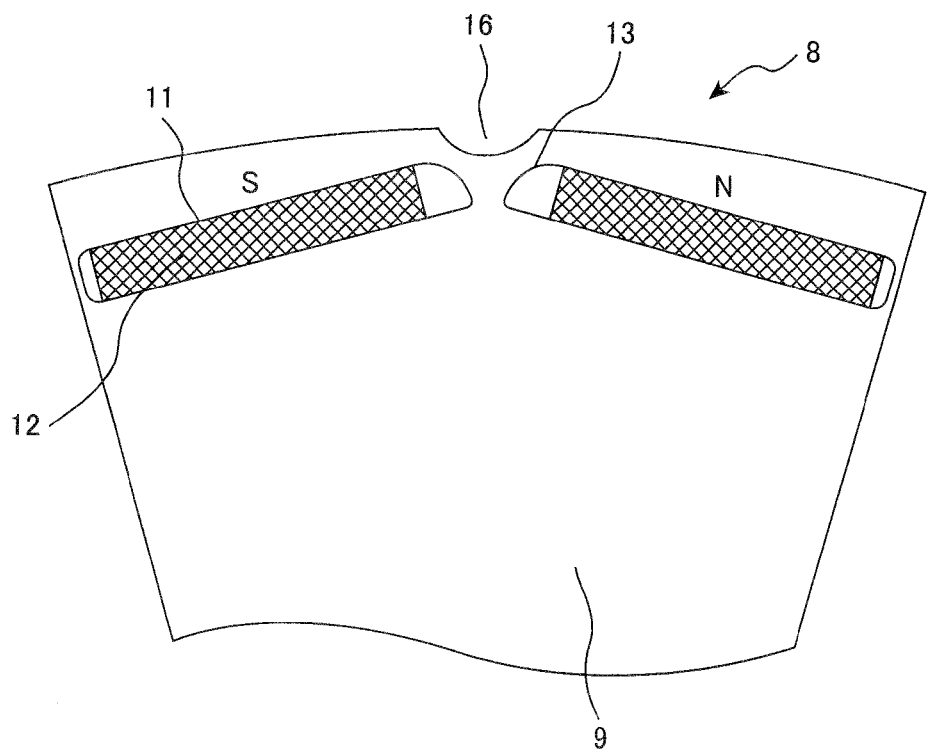
FIG. 12 is an enlarged diagram showing adjacent permanent magnet slots at an interpole between poles of different polarities of a rotor representing embodiment 6 of the present invention (embodiment 6).

FIG. 12 shows an enlarged diagram of adjacent permanent magnet slots 11 at between adjacent poles of different polarities for a rotor 8 representing embodiment 6 of the present invention. In the present embodiment, each part at between adjacent poles of different polarities for the rotor 8 on the rotor outer circumference as shown in connection with embodiment 1, is provide with a recess 16. In the permanent magnet slot 11, the radius of curvature of a curved end portion 13 adjacent to the recess 16 at the rotor outer circumference side is designed to be larger than a radius of curvature of an end portion of the permanent magnet slot 11 not adjacent to the recess 16.

Thus, a provision of the recess 16 and radius of curvature of the curved end portion 13, a connecting area between the recess 16 and the curved portion 13 can be enlarged, stress concentration at the rest core-portion can be dispersed effectively and a stress concentration can be reduced.

Embodiment 7

Figure 13:
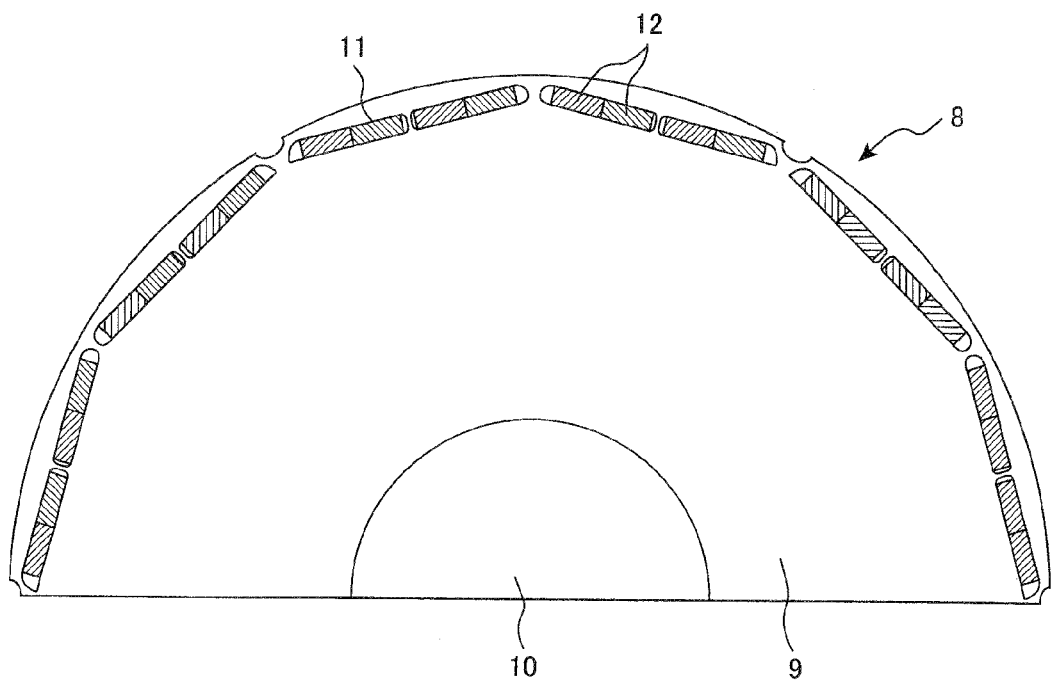
FIG. 13 is a diagram showing a ½ cross section of a rotor representing embodiment 7 of the present invention (embodiment 7).

FIG. 13 shows a ½ cross sectional diagram of a rotor 8 representing embodiment 7 of the present invention. In the present embodiment, within the divided permanent magnet slot 11 in the rotor core 9 as shown in connection with embodiment 1, divided permanent magnets 12 are buried. By dividing the permanent magnet 12 in a permanent magnet slot 11, an eddy current induced in the permanent magnet 12 can be reduced.

Embodiment 8

Figure 14:
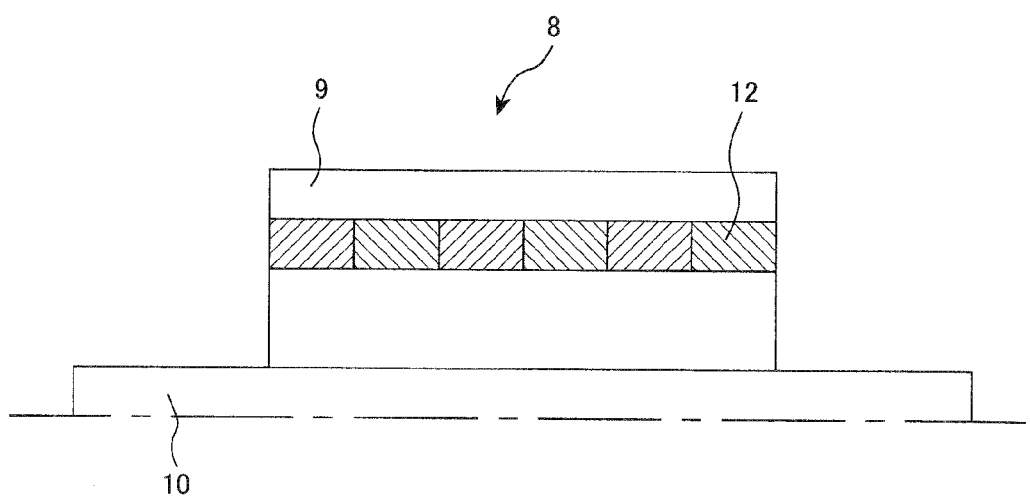
FIG. 14 is a diagram showing a cross section in axial direction of a rotor representing embodiment 8 of the present invention (embodiment 8).

FIG. 14 shows a cross sectional diagram in axial direction of a rotor 8 representing embodiment 8 of the present invention. In the present embodiment, the permanent magnet 12 as shown in connection with embodiment 1 through embodiment 7 is buried after being divided in axial direction. By burying the permanent magnet 12 after being divided in axial direction, an assembling efficiency of the rotor can be enhanced.

Embodiment 9

Figure 15:
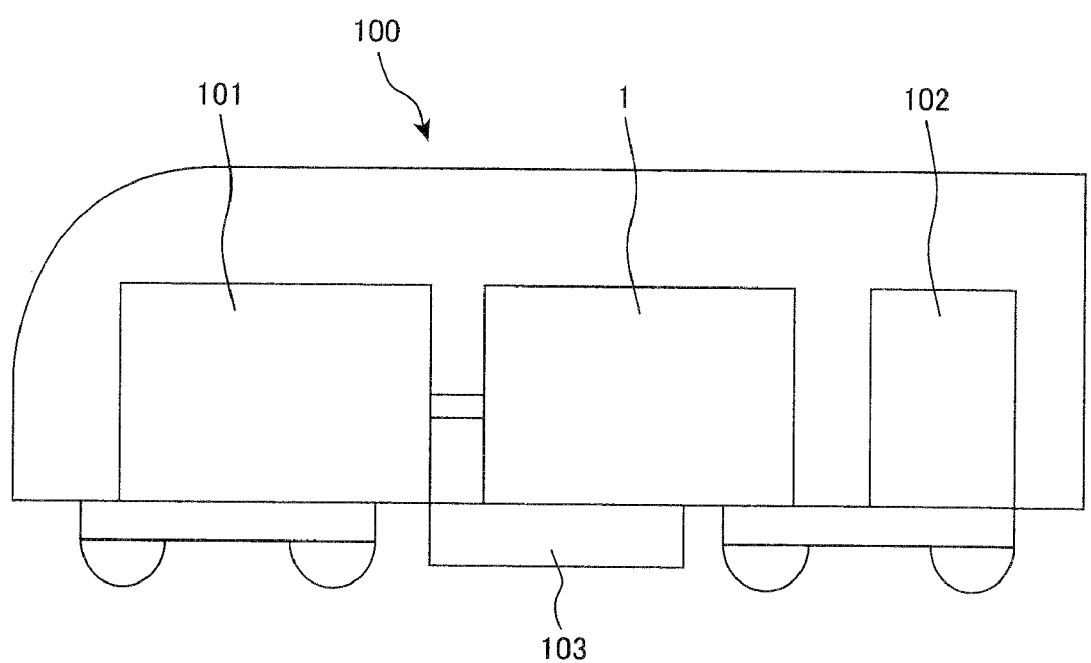
FIG. 15 is a diagram showing an example in which a permanent magnet type rotary electric machine of the present invention is applied to a generator used for a hybrid railway (embodiment 9).

FIG. 15 shows an example in which a permanent magnet type rotary electric machine of the present invention is applied to a generator used for a hybrid railway. An electric rolling stock 100 is provided with a permanent magnet type rotary electric machine 1 as shown in connection with embodiment 1 through embodiment 8, an engine 101, an inverter 102 and a battery 103, and through driving the engine 101, the permanent magnet type rotary electric machine 1 generates an electric power that charges the battery 103 via the inverter 102.

What is claimed is:

1. A permanent magnet type rotary electric machine comprising a stator with a stator core and coils provided into slots of the stator core, and a rotor that is disposed so as to face the stator with a gap, the rotor having a rotor core and permanent magnets buried into the rotor core by being incorporated into permanent magnet slots formed at an outer circumferential-side portion of the rotor core so as to be a plurality of poles,
wherein the permanent magnet slot for each pole is divided at least into four permanent magnet slot segments along an outer circumferential direction in the rotor core so that the permanent magnet slot segments of all poles are arranged along the outer circumferential direction in a row as a whole while having rest core-portions between respective adjacent permanent magnet slot segments, and in the rest core-portions between the respective adjacent permanent magnet slot segments in the rotor core, a width of a first rest core-portion at a middle of each pole and a width of a second rest core-portion between each pair of adjacent poles of different polarities are formed larger than that of the other rest-core portions.

2. A permanent magnet type rotary electric machine according to claim 1,
wherein, when defining a distance between an end at an rotor-outer circumferential side of a permanent magnet slot at the middle of one pole and an outer circumference of the rotor core as "a1", and likewise, a distance between an end at the rotor-outer circumferential side of the permanent magnet slot between adjacent poles of different polarities and the outer circumference of the rotor core 9 as "a1", and the radius of the rotor core as r, a1/r is designed to be more than 0.015 and less than 0.0177.

3. A permanent magnet type rotary electric machine according to claim 1,
wherein a recess is provided between adjacent poles of different polarities for the rotor on an outer circumference of the rotor.

4. A permanent magnet type rotary electric machine according to claim 1,
wherein the divided permanent magnets per one pole for the rotor are disposed in an inverted obtuse V shape when seen from the rotor shaft side, and when defining that an opening angle of the permanent magnets constituted in the obtuse inverted V shape is θ, the θ is set within the range of 120°≦θ≦150°.

5. A permanent magnet type rotary electric machine according to claim 1,
wherein both ends of each of permanent magnet slots for incorporating the divided permanent magnets for the rotor are formed in asymmetry with regard to right and left.

6. A permanent magnet type rotary electric machine according to claim 1,
wherein the permanent magnet incorporated into each of the permanent magnet slots is further divided in each permanent magnet slot.

7. A permanent magnet type rotary electric machine according to claim 1,
wherein, when defining a distance between an end at a rotor-outer circumferential side of the permanent magnet slot at the middle of one pole and an outer circumference of the rotor core as "a1", and likewise, a distance between an end at the rotor-outer circumferential side of the permanent magnet slot between adjacent poles of different polarities and the outer circumference of the rotor core 9 as "a1", and the radius of the rotor core as r, a1 is set to be more than 0.9 mm and less than 1.1 mm.

8. A permanent magnet type rotary electric machine system used for an electric rolling stock that is provided with a permanent magnet type rotary electric machine, an engine, an inverter and a battery, and in which the permanent magnet type rotary electric machine generates an electric power through driving the engine thereby to charge the electric power into the battery via the inverter,
wherein the permanent magnet type rotary electric machine is of the one according to claim 1.

9. A permanent magnet type rotary electric machine comprising a stator with a stator core and coils provided into slots of the stator core, and a rotor that is disposed so as to face the stator with a gap, the rotor having a rotor core and permanent magnets buried into the rotor core by being incorporated into permanent magnet slots formed at an outer circumferential-side portion of the rotor core so as to be a plurality of poles,
wherein a permanent magnet slot per one pole is divided at least into four slots along an outer circumferential direction in the rotor core, and in respective rest core-portions between adjacent divided permanent magnet slots in the rotor core, a width of a first rest core-portion at a middle of each pole and a width of a second rest core-portion between each pair of adjacent poles of different polarities are formed larger than that of the other rest-core portions;
wherein a recess is provided between adjacent poles of different polarities for the rotor on an outer circumference of the rotor; and wherein a radius of curvature of an end portion at the rotor outer circumferential side of the permanent magnet slot segment and adjacent to the recess is set larger than that of an end portion of the permanent magnet slot not adjacent to the recess.

10. A permanent magnet type rotary electric machine comprising a stator with a stator core and coils provided into slots of the stator core, and a rotor that is disposed so as to face the stator with a gap, the rotor having a rotor core and permanent magnets buried into the rotor core by being incorporated into permanent magnet slots formed at an outer circumferential-side portion of the rotor core so as to be a plurality of poles, wherein a permanent magnet slot per one pole is divided at least into four slots along an outer circumferential direction in the rotor core, and in respective rest core-portions between adjacent divided permanent magnet slots in the rotor core, a width of a first rest core-portion at a middle of each pole and a width of a second rest core-portion between each pair of adjacent poles of different polarities are formed larger than that of the other rest-core portions; and wherein all of the divided permanent magnets for the rotor are the same size.

11. A permanent magnet type rotary electric machine comprising a stator with a stator core and coils provided into slots of the stator core, and a rotor that is disposed so as to face the stator with a gap, the rotor having a rotor core and permanent magnets buried into the rotor core by being incorporated into permanent magnet slots formed at an outer circumferential-side portion of the rotor core so as to be a plurality of poles, wherein a permanent magnet slot per one pole is divided at least into four slots along an outer circumferential direction in the rotor core, and in respective rest core-portions between adjacent divided permanent magnet slots in the rotor core, a width of a first rest core-portion at a middle of each pole and a width of a second rest core-portion between each pair of adjacent poles of different polarities are formed larger than that of the other rest-core portions; and wherein the divided permanent magnets for the rotor are disposed along the circumferential direction, and all of the radial positions of the divided permanent magnets are set equal.

12. A permanent magnet type rotary electric machine comprising a stator with a stator core and coils provided into slots of the stator core, and a rotor that is disposed so as to face the stator with a gap, the rotor having a rotor core and permanent magnets buried into the rotor core by being incorporated into permanent magnet slots formed at an outer circumferential-side portion of the rotor core so as to be a plurality of poles, wherein a permanent magnet slot per one pole is divided at least into four slots along an outer circumferential direction in the rotor core, and in respective rest core-portions between adjacent divided permanent magnet slots in the rotor core, a width of a first rest core-portion at a middle of each pole and a width of a second rest core-portion between each pair of adjacent poles of different polarities are formed larger than that of the other rest-core portions; and wherein, when defining that the width of the first rest core-portion at the middle of each pole and the width of the second rest core-portion between adjacent poles of different polarities as "a" and that of the others as "b", a ratio a/b is set to be more than 1.4 and less than 1.6.

* * * * *